United States Patent Office 3,556,633
Patented Jan. 19, 1971

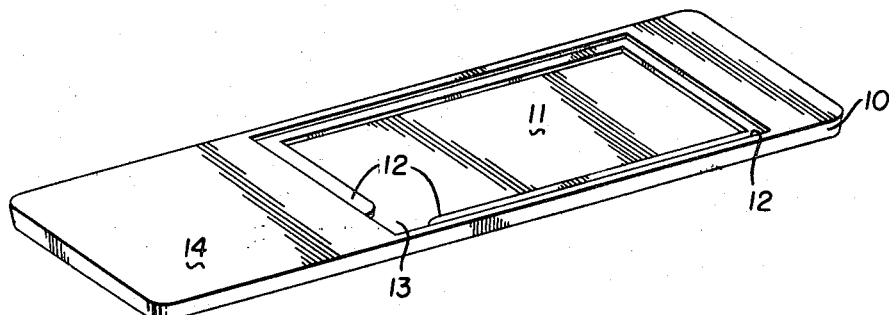
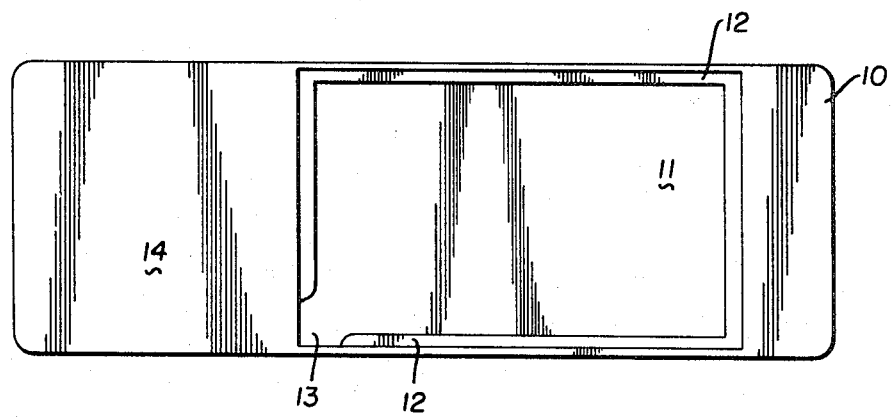
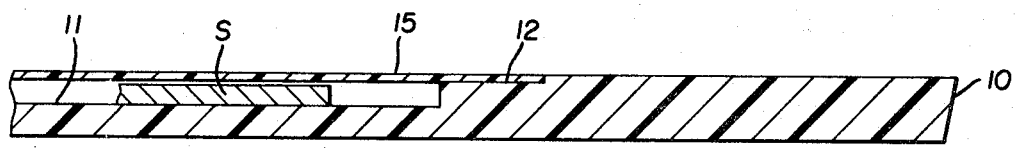
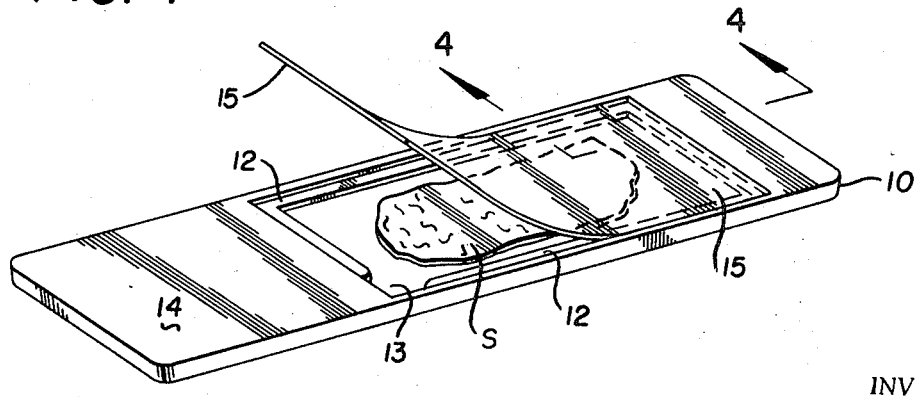

3,556,633
SPECIMEN CARRYING SLIDE WITH RUNOFF TROUGH
Winifred Liu Mutschmann, 3889 Southwood Drive SE., Warren, Ohio 44484, and Nicholas J. Fish, 3900 5th Ave., Youngstown, Ohio 44505
Filed Jan. 17, 1969, Ser. No. 792,021
Int. Cl. G02b 21/34
U.S. Cl. 350—95               1 Claim

ABSTRACT OF THE DISCLOSURE

A specimen carrying slide such as used in laboratories for mounting specimens of tissue to be examined under a microscope takes the form of a molded transparent plastic body member having a flat rectangular cavity occupying a majority of its surface area. A stepped shoulder surrounds the cavity in which the specimen is mounted and a very thin transparent plastic cover slip is positioned on the stepped shoulder so as to form a cover for the specimen positioned in the flat rectangular cavity. A portion of the stepped shoulder is cut away in one of the corners thereof to form a trough or runoff point so that excess fluid on the specimen may be accommodated.

BACKGROUND OF THE INVENTION (1) Field of the invention

This invention relates to specimen carrying slides for mounting specimens of tissue to be examined under a microscope.

(2) Description of the prior art

Prior structures of this type have comprised rectangular sections of thin flat glass with unbroken flat surfaces. The specimen of tissue or the like to be mounted has simply been placed on one of these flat surfaces and adhered thereto by its natural fluids in most instances. The specimen is then dyed so that it is more readily visible when positioned under a microscope. In the past such specimens have frequently been damaged by being brought into contact with other articles. A great many such specimen slides are used in a laboratory such as in a hospital wherein the pathologists make routine examinations of tissues as necessary in their diagnosis.

This invention eliminates the possibility of damaging the specimen and insures its safe and desirable mounting so that it may be examined and reexamined under a microscope as desired. Additionally, it is very inexpensive and expendable.

SUMMARY OF THE INVENTION

A speciment carrying slide comprising a thin rectanglar body member of optically clear plastic having a rectangular recess in a major portion of one of its ffat surfaces and spaced inwardly from the ends thereof and located off center with respect to the ends thereof. The recess forming a flat rectangular cavity having a stepped shoulder thereabout a corner portion of which is cut away to form a trough or runoff point. A very thin section of optically clear plastic forms a cover slip registrable on the stepped shoulder so as to enclose a specimen of tissue or the like disposed in the flat rectangular cavity in the specimen carrying slide.

DESCRIPTION OF THE DRAWINGS

FIG. 1 is a perspective view of the specimen carrying slide on an enlarged scale and without the cover slip.

FIG. 2 is a top plan view of the specimen carrying slide seen in FIG. 1 and on an enlarged scale.

FIG. 3 is a perspective view of the specimen carrying slide including a cover slip partly positioned thereon and showing a section of tissue disposed in the flat rectangular cavity of the slide and all on an enlarged scale.

FIG. 4 is an enlarged cross sectional detail on line 4—4 of FIG. 3.

DESCRIPTION OF THE PREFERRED EMBODIMENT

The specimen carrying slide disclosed herein is of the general size and shape of the glass specimen mounting slides heretofore used in laboratories for mounting specimens of tissue for microscopic examination. The present invention discloses the specimen carrying slide as a molded plastim body 10 of transparent relatively rigid plastic material having a flat rectangular cavity 11 formed in a large portion of one of its flat surfaces and preferably of a depth approximating fifty percent of the thickness of the slide body 10. The flat rectangular cavity 11 has a stepped shoulder configuration 12 extending continuously around the rectangular shape of the flat rectangular cavity 11 with the exception of a corner area which is cut away to form a trough or runoff point 13. A substantially square end portion 14 of the slide body member 10 is provided to facilitate handling and this locates the flat rectangular cavity off center with respect to the transverse center line of the slide body 10 as clearly illustrated in the drawings.

The area within the flat rectangular cavity 11 receives the specimen to be examined. Those skilled in the art will recognize that specimens mounted for microscopic examination comprise thin slices of body tissues or the like and it will be apparent that the flat rectangular cavity 11 provides an ideal location for positioning the specimen. Normally, the natural fluids of the specimen cause it to adhere to the slide and it is subsequently dyed before examination. These same steps are followed in using the specimen carrying slide disclosed herein with the exception that after the mounting and dying steps the specimen as seen for example in FIGS. 3 and 4 of the drawings and indicated by the letter S is covered with a very thin rectangular cover slip 15 which is formed of optically clear plastic material such as Mylar.

In the preferred embodiment of the specimen carrying slide, the flat rectangular cavity 11 is $35/1000$ of an inch in depth while the slide itself is $70/1000$ of an inch thick. The stepped shoulder is depressed with respect to the surface of the slide $10/1000$ of an inch and the cover slip 14 is formed of material having a matching thickness. Both the slide 10 and the cover slip 15 can be rapidly and inexpensively molded so that the resultant product is expendable.

Other advantages attained through the use of the specimen carrying slide will occur to laboratory technicians, pathologists and other skilled personnel who have long recognized the problems of properly mounting specimens for microscopic examination.

Although but one embodiment of the present invention has been illustrated and described, it will be apparent to those skilled in the art that various changes and modifications may be made therein without departing from the spirit of the invention.

What is claimed is:

1. A specimen carrying slide comprising a thin rectangular body member having a flat recessed rectangular cavity formed in one side thereof, a stepped shoulder formed continuously in two of the edges of said cavity and in portions of the other two edges thereof and terminating short of one of the corners of said cavity, an enlarged corner area in communication with said cavity being formed thereby to form a runoff area and a thin optically clear cover slip of a size registrable with said cavity and engageable on said stepped shoulders so as to cover said cavity and said enlarged corner area and protect a specimen positioned in said cavity.

References Cited
UNITED STATES PATENTS

| | | | |
|---|---|---|---|
| 2,015,949 | 10/1935 | Maw | 350—246 |
| 2,351,282 | 6/1944 | Oliver | 350—95 |
| 3,029,695 | 4/1962 | Wolf | 350—95 |
| 3,031,924 | 5/1962 | Lamal | 350—95 |
| 3,065,669 | 11/1962 | Orsi | 350—95 |

FOREIGN PATENTS

| | | | |
|---|---|---|---|
| 202 | 1/1884 | Great Britain | 350—92 |

DAVID SCHONBERG, Primary Examiner

T. H. KUSMER, Assistant Examiner